United States Patent
Merschel et al.

(10) Patent No.: US 12,346,377 B2
(45) Date of Patent: Jul. 1, 2025

(54) STORING GRAPH DATA IN A KEY-VALUE STORE

(71) Applicant: INTERNATIONAL BUSINESS MACHINES CORPORATION, Armonk, NY (US)

(72) Inventors: Alexander Merschel, Stuttgart (DE); Nehal Dudani, Hamburg (DE); Dennis Butterstein, Stuttgart (DE); Martin Anton Oberhofer, Sindelfingen (DE); Thomas Schwarz, Stuttgart (DE); Tobias Kevin Fränzel, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 17/938,481

(22) Filed: Oct. 6, 2022

(65) Prior Publication Data

US 2024/0119091 A1  Apr. 11, 2024

(51) Int. Cl.
*G06F 16/901* (2019.01)
*G06F 16/906* (2019.01)

(52) U.S. Cl.
CPC ........ *G06F 16/9024* (2019.01); *G06F 16/906* (2019.01)

(58) Field of Classification Search
CPC .................. G06F 16/9024; G06F 16/906
See application file for complete search history.

(56) References Cited

U.S. PATENT DOCUMENTS

| | | | |
|---|---|---|---|
| 2003/0037060 A1* | 2/2003 | Kuehnel | G06F 12/08 |
| 2011/0208737 A1* | 8/2011 | Shmueli | G06F 16/9027 |
| | | | 707/E17.091 |
| 2016/0179883 A1* | 6/2016 | Chen | G06F 16/2282 |
| | | | 707/741 |
| 2017/0277725 A1* | 9/2017 | Fang | G06F 16/162 |
| 2019/0042662 A1* | 2/2019 | Cohen | G06F 16/9024 |
| 2020/0142875 A1* | 5/2020 | Cao | G06F 16/27 |
| 2024/0028648 A1* | 1/2024 | Borthakur | G06F 16/248 |

FOREIGN PATENT DOCUMENTS

| | | |
|---|---|---|
| CN | 109446362 A | 3/2019 |
| WO | 2017131623 A1 | 8/2017 |

OTHER PUBLICATIONS

Author Unknown, "Data Modeling", Data Modeling—FoundationDB 7.1, https://apple.github.io/foundationdb/data-modeling.html, Last updated on Aug. 10, 2022, Accessed on Sep. 14, 22, pp. 1-15.

(Continued)

*Primary Examiner* — Charles D Adams
(74) *Attorney, Agent, or Firm* — Elliot J. Shine

(57) ABSTRACT

A method, computer system, and a computer program product for storing a graph is provided. The present invention may include providing a key-value store. The present invention may include storing a graph in the key-value store, wherein storing a specific node of the graph in the key-value store comprises: storing, as a key, identifiers of the specific node and of k-hop neighborhood of the specific node, and as value of the key, attribute values of the specific node, wherein the k-hop neighborhood of the specific node comprises a set of neighboring nodes that are reachable from the specific node within k edges.

19 Claims, 10 Drawing Sheets

(56) References Cited

OTHER PUBLICATIONS

Author Unknown, "Simple Indexes", Simple Indexes—FoundationDB 7.1, https://apple.github.io/foundationdb/simple-indexes.html, Last updated on Aug. 10, 2022, Accessed Sep. 14, 2022, pp. 1-3.

Girvan, et al., "Community structure in social and biological networks", PNAS, https://www.pnas.org/content/99/12/7821, Jun. 11, 2002, vol. 99, No. 12, pp. 7821-7826.

Goswami, et al., "GraphMap: scalable iterative graph processing using NoSQL", Springer Science+Business Media, The Journal of Supercomputing, https://link.springer.com/article/10.1007/s11227-019-03097-w, Published online Dec. 4, 2019, pp. 1-29.

Kong, et al., "Clustering-based Partitioning for Large Web Graphs", arXiv:2201.00472v1 [cs.DC], Jan. 3, 2022, https://arxiv.org/abs/2201.00472, pp. 1-14.

Yang et al., "WLeidenRDF: RDF Data Query Method based on Semantic-Enhanced Graph-Clustering Algorithm", https://ieeexplore.ieee.org/document/9405336, 2020 International Symposium on Theoretical Aspects of Software Engineering (TASE), Accessed Sep. 26, 2022, pp. 33-40.

* cited by examiner

STORING GRAPH DATA IN A KEY-VALUE STORE

BACKGROUND

The present invention relates to the field of digital computer systems, and more specifically, to a method for persisting graph data.

A graph may comprise vertices (e.g., nodes) which are connected by edges (e.g., links). A distinction may be made between undirected graphs, where edges link two vertices symmetrically, and directed graphs, where edges link two vertices asymmetrically. The graphs may advantageously be used for different applications such as big data applications of interrelated data from various sources. However, there is a continuous need to improve access to the graph data.

SUMMARY

Embodiments of the present invention disclose a method, computer system, and a computer program product for storing a graph. The present invention may include providing a key-value store. The present invention may include storing a graph in the key-value store, wherein storing a specific node of the graph in the key-value store comprises: storing, as a key, identifiers of the specific node and of k-hop neighborhood of the specific node, and as value of the key, attribute values of the specific node, wherein the k-hop neighborhood of the specific node comprises a set of neighboring nodes that are reachable from the specific node within k edges.

In another embodiment, the method may include clustering a plurality of nodes of the graph into one or more clusters of closely connected nodes; assigning one or more pages of the key-value store to each of the one or more clusters, wherein storing the specific node in the key-value store comprises: identifying the one or more pages of a cluster to which a specific node belongs; and storing the specific node in the one or more pages identified.

In a further embodiment, the method may include assigning the one or more pages to each of the one or more clusters such that the storage of the nodes on the pages leaves in each of the one or more pages a predefined minimum free space.

In another embodiment, the method may include receiving a request to insert a node; determining the closest cluster to the node, wherein the closest cluster comprises the largest part of the neighboring nodes of the node; and storing the node in the one or more pages assigned to the determined cluster.

In yet another embodiment, the method may include receiving one or more changes to the stored graph, wherein the one or more changes is greater than a minimum number of changes; re-clustering the nodes of a changed graph; reassigning the one or more pages to at least one of the plurality of clusters; and storing the nodes of the at least one cluster in the one or more pages reassigned.

In yet another embodiment, the method may include receiving a request to insert a first node; storing the first node in the key-value store; receiving a request to insert an edge connecting the first node and a second node of the graph; updating the key of the first node with a second node identifier; and updating the key of the second node with a first node identifier.

In yet another embodiment, the method may include receiving a request to delete an edge connecting a first node to a second node of the graph; updating a first node key by deleting an identifier of the second node; and updating a second node key by deleting an identifier of the first node.

In yet another embodiment, the method may include receiving a request to delete at least one of the plurality of nodes of the key-value store; and deleting the at least one node and all edges connected to the at least one node, wherein deleting includes updating the key for each of the plurality of nodes to which said edges are connected such that the identifier of the at least one deleted node is removed from the keys.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the following embodiments of the invention are explained in greater detail, by way of example only, making reference to the drawings in which.

DETAILED DESCRIPTION

Figure 1:
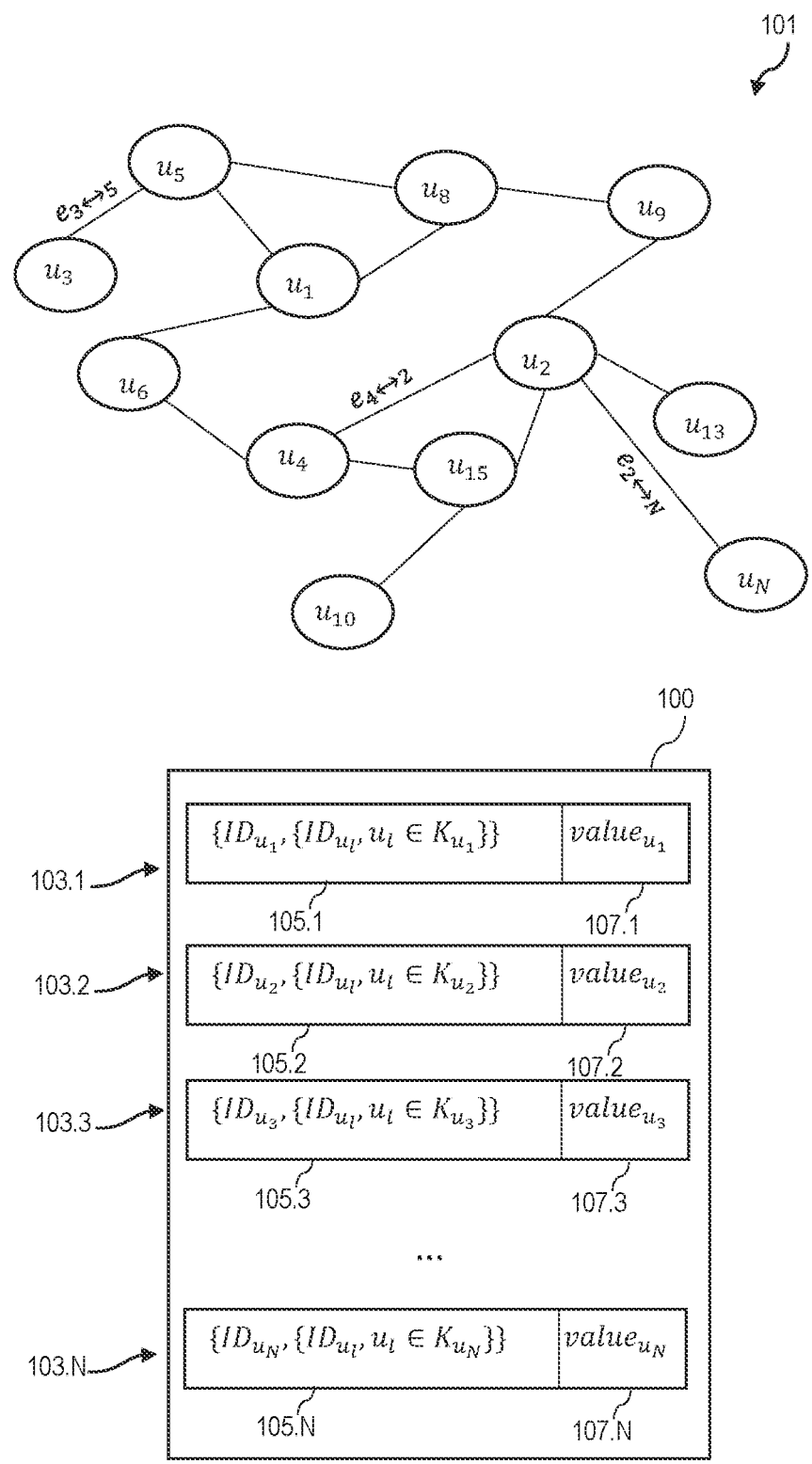
FIG. 1 is a diagram illustrating content of a key-value store in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A graph refers to a property graph where data values are stored as properties on nodes and edges. Property graphs may be managed and processed by a graph database management system or other database systems which provide a wrapper layer converting the property graph to, for example, relational tables for storage and convert relational tables back to property graphs when read or queried. The graph may, for example, be a directed graph. The graph may be a collection of nodes (also called as vertices) and edges. The edge of the graph connects any two nodes of the graph. The edge may be represented by an ordered pair (u1, u2) of nodes and that can be traversed from node u1 (starting node) toward node u2. A node of the graph may represent an entity. The entity refers to a user, object etc. The entity may have certain entity attributes or properties which may be assigned values. For example, a person may be an entity. The entity attributes of the person may, for example, comprise a marital status, age, gender etc. The edge may be assigned edge attribute values indicative of at least a relationship between the two nodes connected to the edge. The relationship may, for example, comprise an inheritance (e.g., parent and child) relationship and/or associative relationship in accordance with a certain hierarchy. For example, the inheritance relationship between nodes u1 and u2 may be referred to as a "is-a relationship" between u1 and u2 e.g., "u2 is-a parent of u1". The associative relationship between nodes u1 and u2 may be referred to as a "has-a relationship" between u1 and u2 e.g., "u2 has a has-a relationship with u1" means that u1 is part or is a composition of or associated with u2.

However, accessing a graph may be a challenging task. For example, a typical gremlin query may request a node and connected nodes of a k-hop neighborhood. If the requested nodes are connected via edges and are on different storage pages, a read of two nodes connected via an edge may require at least two page reads from disk making the operation slow. The present subject matter may solve this issue by storing the graph data in a key-value store. The key-value store may be a key-value database. The key-value store may be a data storage configured for storing, retrieving, and managing associative arrays, and a data structure such as a dictionary or hash table. The present subject matter may be beneficial because finding all edges for a node may no longer be a range query on the edge index but a single node lookup.

The graph may, for example, be defined as follows: G=(V, E) where V and E are the set of nodes and edges respectively, where |V|=N is the number of nodes in the graph. Each edge e∈E connects a node pair, (u, v)∈(V×V). Each node u of the graph may be stored in the key-value store using a storage method. The storage method comprises storing as a key in the key-value store the identifier of the node u and identifiers of the k-hop neighborhood of the node u. The storage method may further comprise storing a value in association with the key. The k-hop neighborhood of the node u refers to a set of nodes (named a set of neighboring nodes) that are reachable from the node u within k edges. The set of neighboring nodes may comprise $m_u$ nodes $v_1^u, v_2^u, \ldots, v_{m_u}^u$, where the upper index indicates that the node $v_i$ is a neighboring of the node u. In addition, attribute values of the node u may be stored as the value associated with said key. The attribute values of the node u may be values of the entity attributes of the entity represented by the node u. Thus, each node u of the graph may be stored as a record in the key-value store. For example, the record associated with node u may comprise an array of $m_u+1$ identifiers of the nodes:

$$[ID_u, ID_{v_1^u}, ID_{v_2^u}, \ldots, ID_{v_{m_u}^u}]$$

and associated value $value_u$. The identifier of a node may, for example, be a technical ID or vertex ID that uniquely identifies the node within the graph. The key $$[ID_u, ID_{v_1^u}, ID_{v_2^u}, \ldots, ID_{v_{m_u}^u}]$$

may, for example, be provided as a set of byte strings and/or byte integers. The value associated with the key may, for example, be a byte string or byte integer. Thus, the key-value store may comprise the following set of records:

$$\{[ID_u, ID_{v_1^u}, ID_{v_2^u}, \ldots, ID_{v_{m_u}^u}],$$

$value_u$, $1 \leq u \leq N$}. A record may be retrieved using a key's ID that uniquely identifies the record, to find the data within the key-value store. The key $$[ID_u, ID_{v_1^u}, ID_{v_2^u}, \ldots, ID_{v_{m_u}^u}]$$

of the node u may be unique because the identifier ID u of the node u may be unique.

According to one embodiment, the k-hop neighborhood is a one hop neighborhood (i.e., k=1) comprising adjacent neighbors of the specific node.

To further improve the read times, the graph may be broken down into clusters of closely connected nodes by clustering algorithms such as the Girvan-Newman algorithm or the WLeidenRDF algorithm. The nodes in these clusters may be stored on the same, or adjacent, pages to reduce the number of pages that must be read from the key-value store as well as making sure pages of the same cluster are localized closely on the storage level e.g., for avoiding a lot of seek operations on disk. Thus, according to one embodiment, the method further comprises clustering the nodes of the graph into clusters (e.g., into clusters of closely connected nodes), and assigning one or more pages of the key-value store to each cluster, wherein storing the specific node in the key-value store comprises: identifying the one or more pages of the cluster to which the specific node belongs, and performing the storage of the specific node in the identified one or more pages.

The term "page" or "storage page" may refer to a same block of a defined size, which may typically be a multiple of 2, such as 4096, 8192, 16384, or 32768 bytes. The page may represent the smallest storage block that can be written to at a given time. The clustering may result in clusters of nodes, wherein storing the graph in the key-value store comprises storing each node u of each cluster cl of the clusters in the one or more pages assigned to the cluster cl using the storage method.

The clustering may, for example, be any one of: an edge betweenness clustering, Girvan-Newman clustering, WLeidenRDF clustering, or k-Means clustering. The edge betweenness clustering may identify clusters in the graph by progressively removing the edge with the highest betweenness centrality from the graph. Betweenness centrality may measure how often a node/edge lies on the shortest path between each pair of nodes in the graph. The k-Means clustering may partition the graph into k clusters based on the location of the nodes such that their distance from the cluster's centroid is minimum. The distance may be Euclidean distance, Euclidean-squared distance, Manhattan distance, or Chebyshev distance.

Storing the nodes based on clustering may speed up the processing of the queries to the key-value store, because the query results may be correlated with the formed clusters of the nodes, that is, if a node fulfills a given query the remaining nodes of the cluster to which said node belongs may fulfill the query as well.

According to one embodiment, the one or more pages assigned to the cluster are adjacent pages. This may further speed up the processing of the queries as the pages of a same cluster are adjacent. Indeed, for clusters that span more than one page, the read speeds can be improved if the different pages the cluster spans across are located in close proximity on the key-value store.

According to one embodiment, the clustering may be performed so that each resulting cluster may have a number of nodes smaller than a maximum number of the nodes that can fit within one single page. For example, the pages of the key-value store may each have a 4 k page size on disk. In addition, each page may comprise 100 bytes reserved for meta information. Assuming that an identifier of a node is a BigInt occupying 4 bytes or less and that each node has an average of 10 edges, this means that 11 identifiers which form the array list of the key occupy 44 bytes. Each page may thus comprise a maximum number of 88 nodes, i.e., 88=int(3900:44), where int(.) is the integer part function. Following this example with a 4 k page size and identifier being BigInt with 4 bytes, and 100 bytes reserved for meta information, a page could hold 975 IDs. Hence, if a node has over 974 neighbors, the key of the node will span across more than one page, e.g., it spans a first page storing 974 IDs and a second next page storing one or more IDs. A pointer to the page with the continuation of the key may be stored in the meta information of the first page and/or second page.

According to one embodiment, the method further comprises: assigning the pages such that the storage of the nodes on the pages leaves in each page a predefined minimum free space. Each page may have a percentage free space so that nodes added later fitting into the cluster can be placed on the same page.

According to one embodiment, the clustering is performed such that the nodes of the cluster can be stored in a single page. Storing a same cluster in one page may further speed up the processing of the queries to the key-value store. From a read perspective, disk seek operations may be avoided.

According to one embodiment, the identifier of the node comprises a logical ID indicating the cluster of the node and a technical ID of the node uniquely identifying the node in the graph. Thus, each node may have two IDs, a technical ID given by a graph engine and logical ID given by the clustering. The technical ID may be used to form the key as described herein and the sort to page may happen by the logical ID. For example, the nodes that have the same logical ID may be placed onto the same page. The logical ID may, for example, be used to determine to which cluster belongs a node having said logical ID. This may indicate, for example, where to store the node based on the cluster to which it belongs. The technical ID may be used to query the key-value store e.g., in order to retrieve the key of the node having said technical ID. The retrieved key may enable to find neighboring nodes of the queried node.

According to one embodiment, the number of assigned pages per cluster is one. The method further comprises: in case a cluster cannot be stored in one page, the cluster may be split into two or more clusters, such that each of the two or more clusters can be stored in one page.

The key may not be static, because the identifiers of connected nodes may need updates as relationships get added or removed. According to one embodiment, the method further comprises: receiving a request to insert a node, determining the closest cluster to the node, and storing the node in the one or more pages assigned to the determined cluster. The node to be inserted may be stored in the key-value store using the storage method. Storing a new node close to its neighbors may improve the initial performance without having to run the clustering algorithm.

According to one embodiment, the closest cluster is a cluster that comprises the largest part of the neighboring nodes of the node. For example, the k-hop neighborhood of the node to be inserted may be determined, wherein the k-hop neighborhood comprises a set of nodes. The cluster that comprises the highest number of nodes of that set of nodes may be the closest cluster.

According to one embodiment, the method further comprises: receiving one or more changes to the stored graph, re-clustering the nodes of the changed graph, reassigning one or more pages to each cluster of the clusters, and performing the storage of the nodes of the clusters in the respective pages.

A change of a graph may include a modification of one or more attributes of one or more elements, a deletion of one or more elements and/or insertion of one or more new elements in the graph. The element may be a node or an edge. This embodiment may enable to fully optimize the read speeds, because for each action/change the clustering may be re-run and the storage may be reorganized. However, as the clustering algorithm and reorganizing the storage may be very complex tasks with high resource utilization, they may only be run when a certain threshold of changes is surpassed. Thus, according to one embodiment, the number of one or more changes is higher than a minimum number of changes. Rerunning the clustering algorithm once a certain threshold of changes is surpassed may ensure the continued performance gain and node location on disk.

According to one embodiment, the method further comprises: in case a new node is to be inserted in the graph without any edges, storing the new node in a randomly selected page of the pages. This may particularly be advantageous as the pages may be provided with the minimum free space where this node can be stored prior to reorganization of the storage.

According to one embodiment, the method further comprises: storing in each page of the pages meta information descriptive of the nodes stored in the page, wherein the meta information comprises at least one of the following: pointer to a previous page of the pages, pointer to a next page of the page, number of nodes on the page or information indicating whether a node of the page is stored across more than one page. The meta information may, for example, be used for searching nodes in the key-value store.

According to one embodiment, the method further comprises: receiving a request to insert a first node. In response to receiving the request to insert the first node, the first node may be stored in the key-value store using the storage method. A further request to insert an edge connecting the first node to a second node of the graph may be received, and in response, the key of the first node (e.g., a first node key) may be updated with an identifier of the second node, and the key of the second node (e.g., a second node key) may be updated with an identifier of the first node. This may particularly be advantageous for operations of graphs using gremlin because the node insert may happen before edge insert is done.

For example, the key of the first node u1 may comprise the following array list:

$$\left[ ID_{u1}, ID_{v_1^{u1}}, ID_{v_2^{u1}}, \ldots, ID_{v_{m_{u1}}^{u1}} \right]$$

and the key of the second node u2 may comprise the following array list:

$$\left[ ID_{u2}, ID_{v_1^{u2}}, ID_{v_2^{u2}}, \ldots, ID_{v_{m_{u2}}^{u2}} \right].$$

After receiving the request to insert the edge connecting the first node to the second node, meaning that the two nodes are adjacent neighboring to each other, the key of the first node may become after update as follows:

$$\left[ ID_{u1}, ID_{v_1^{u1}}, ID_{v_2^{u1}}, \ldots, ID_{v_{m_{u1}}^{u1}}, ID_{u2} \right],$$

where $ID_{u2}$ is inserted in the list, and the key of the second node may become as follows:

$$\left[ ID_{u2}, ID_{v_1^{u2}}, ID_{v_2^{u2}}, \ldots, ID_{v_{m_{u2}}^{u2}}, ID_{u1} \right],$$

where $ID_{u1}$ is inserted in the list.

According to one embodiment, the method further comprises: receiving a request to delete an edge connecting a first node to a second node of the graph; updating the key of the first node by deleting an identifier of the second node; and updating the key of the second node by deleting an identifier of the first node.

Following the above example, the key of the first node u1 may comprise the following array list:

$$\left[ ID_{u1}, ID_{v_1^{u1}}, ID_{v_2^{u1}}, \ldots, ID_{v_{m_{u1}}^{u1}}, ID_{u2} \right]$$

and the key of the second node u2 may comprise the following array list:

$$\left[ ID_{u2}, ID_{v_1^{u2}}, ID_{v_2^{u2}}, \ldots, ID_{v_{m_{u2}}^{u2}}, ID_{u1} \right].$$

After receiving the request to delete the edge connecting the first node to the second node, the key of the first node may become after update as follows:

$$\left[ ID_{u1}, ID_{v_1^{u1}}, ID_{v_2^{u1}}, \ldots, ID_{v_{m_{u1}}^{u1}} \right],$$

where $ID_{u2}$ is removed from the list, and the key of the second node may become as follows:

$$\left[ ID_{u2}, ID_{v_1^{u2}}, ID_{v_2^{u2}}, \ldots, ID_{v_{m_{u2}}^{u2}} \right],$$

where $ID_{u1}$ is removed from the list.

According to one embodiment, the method further comprises: receiving a request to delete a node of the key-value store. The node and all edges connected to the node may be deleted, wherein the deleting comprises: updating the keys of nodes to which said edges are connected so that the identifier of the deleted node is removed from the keys.

According to one embodiment, the identifier of the node is a technical ID provided by the graph to uniquely identify the node in the graph. For example, upon receiving a query for a node, the identifier of the requested node may be searched in the key parts of the key-value store. It may be determined from the identified record, the list of nodes of the k-hop neighborhood of the searched node.

FIG. 1 is a diagram illustrating content of a key-value store in accordance with an example of the present subject matter. The key-value store 100 is configured to store pairs of (key, value). For example, the key-value store 100 may store nodes of a graph 101. The graph 101 comprises a set of N nodes $u_1, u_2, \ldots, u_N$ and edges connecting the nodes. For example, the edge referenced by $e_{i \leftrightarrow j}$ may be an edge connecting nodes $u_i$ and $u_j$ where $i \neq j$ and $i,j=1, \ldots, N$. Only part of the nodes and edges are shown for simplification of the drawing. The key-value store 100 may comprise N entries or records 103.1-N, wherein each record corresponds to a respective node of the graph 101. Each record 103.1-N comprises a key 105.1-N and a value 107.1-N. The record associated with node $u_i$, where i can be any number between 1 and N, may comprise a key in the form of the following array of IDs $\{ID_{u_i}, \{ID_{u_l}, u_l \in K_{u_i}\}\}$, where $\{ID_{u_l}, u_l \in K_{u_i}\}$ is the set of IDs of the nodes of the k-hop neighborhood $K_{u_i}$ of the node $u_i$. The k-hop neighborhood of the node $u_i$ comprises a set of neighboring nodes that are reachable from the node $u_i$ within k edges. The record associated with node $u_i$ may further comprise a value $value_{u_i}$ e.g., comprising attribute values of the node $u_i$.

Figure 2:
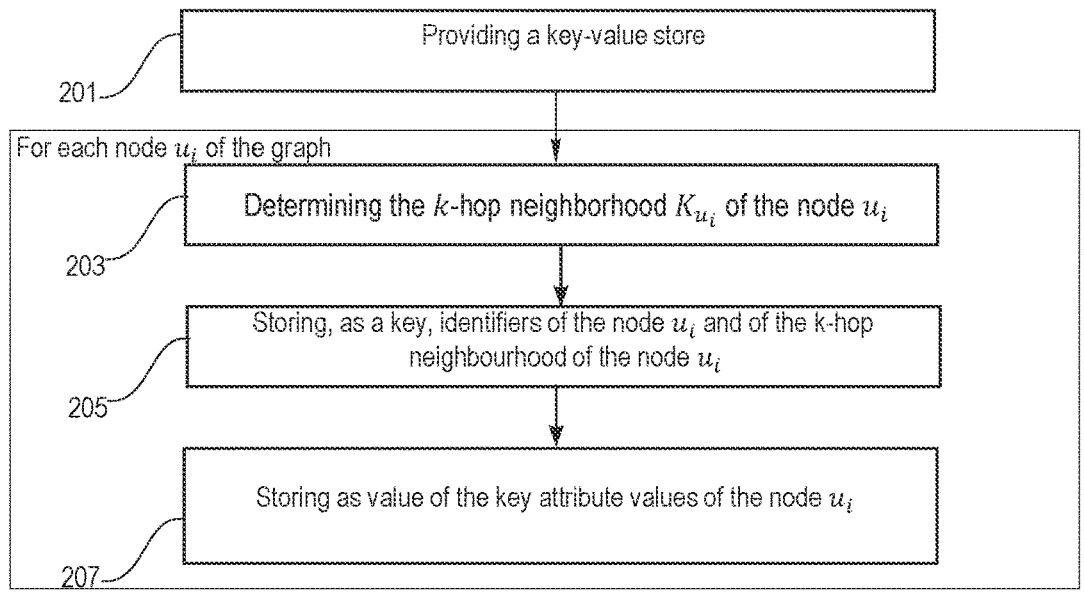
FIG. 2 is a flowchart of a method for storing a graph comprising nodes representing entities and edges representing relationships between the entities in accordance with an example of the present subject matter.

FIG. 2 is a flowchart of a method for storing a graph comprising nodes representing entities and edges representing relationships between the entities. The method of FIG. 2 may be described with reference to FIG. 1, but it is not limited to that implementation of FIG. 1.

A key-value store 100 may be provided in step 201. The key-value store 100 may, for example, be part of the computer system that executes the method of FIG. 2. For each node $u_i$ of the graph 101, the method steps 203 to 207 may be performed. In step 203, the k-hop neighborhood $K_{u_i}$ of the node $u_i$ may be determined. For example, k=1, k=2 or k=3. In step 205, a key 105.i may be stored in the key-value store 100, wherein the key comprises an array of IDs $\{ID_{u_i}, \{ID_{u_l}, u_l \in K_{u_i}\}\}$, where $\{ID_{u_l}, u_l \in K_{u_i}\}$ is the set of IDs of the nodes of the k-hop neighborhood $K_{u_i}$ of the node $u_i$. In step 207, a value $value_{u_i}$ 107.i (e.g., comprising attribute values of the node $u_i$) may be stored in the key-value store 100 in association with the key 105.i of the node $u_i$.

Figure 3A:
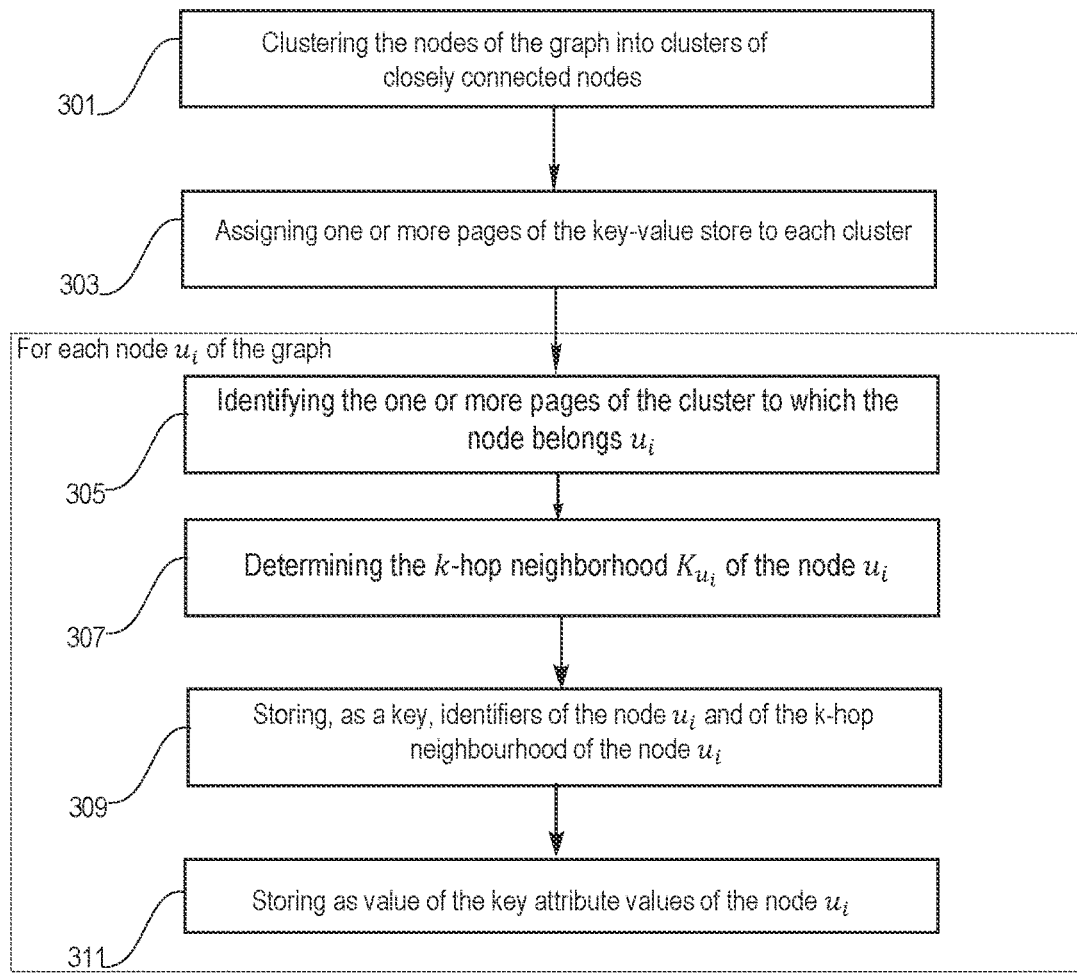
FIG. 3A is a flowchart of a method for storing a graph comprising nodes representing entities and edges representing relationships between the entities in accordance with an example of the present subject matter.

FIG. 3A is a flowchart of a method for storing a graph comprising nodes representing entities and edges representing relationships between the entities. The method of FIG. 3A may be described with reference to FIG. 1, but it is not limited to that implementation of FIG. 1.

Figure 3B:
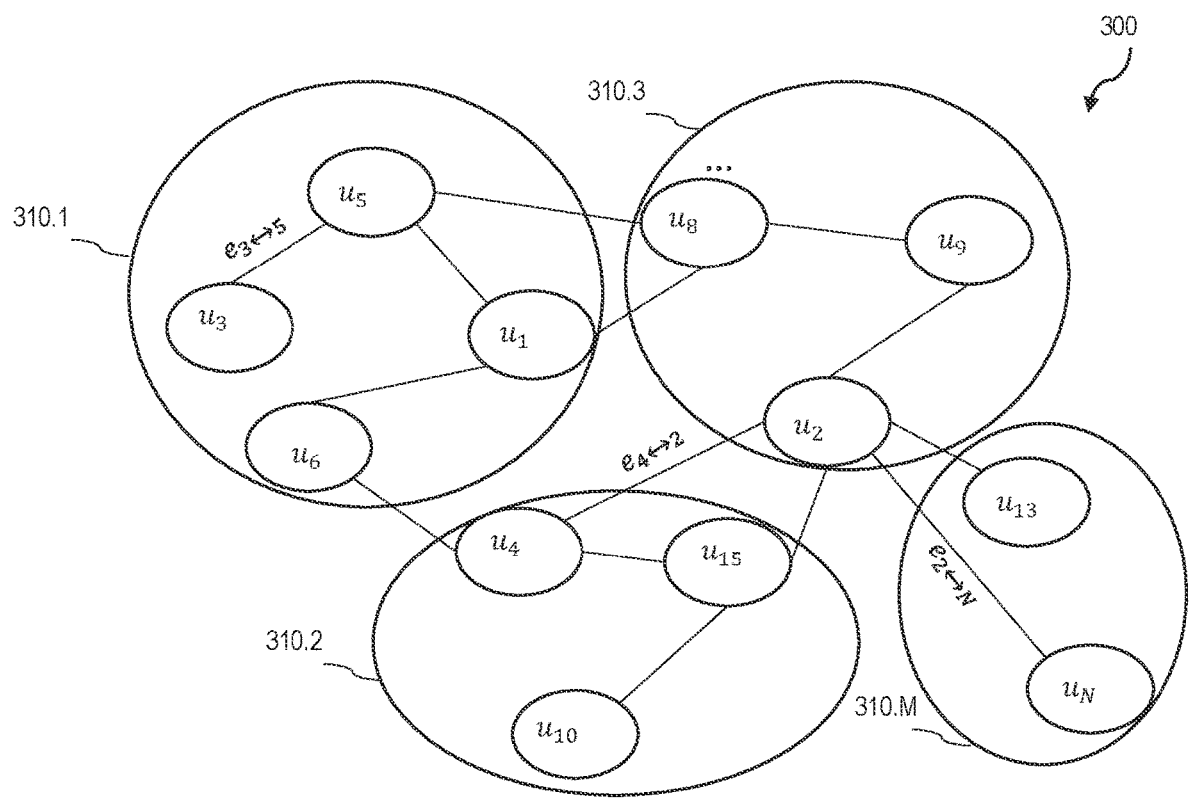
FIG. 3B is an example of a clustered graph of nodes.
Figure 3C:
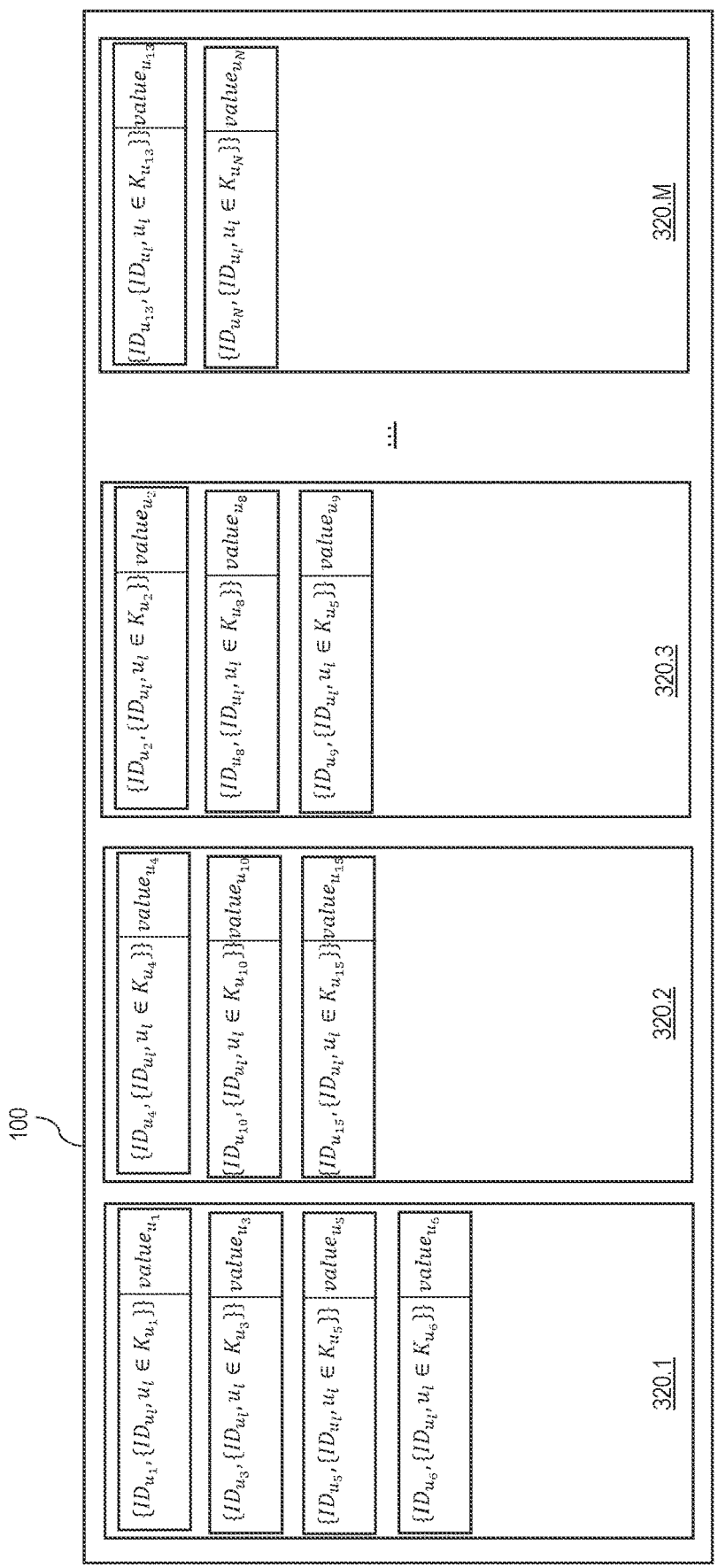
FIG. 3C depicts an example content of the key-value store.

The nodes of the graph 300 shown in FIG. 3B may be clustered in step 311 into clusters of closely connected nodes. This may result in a number M of clusters 310.1-M as illustrated in FIG. 3B. Only part of the clusters are shown for simplification of the drawing. Each of the M clusters 310.1-M may be assigned in step 303 one or more pages of the key-value store 100. For simplification of the description, only one page is assigned to each cluster. This is indicated in FIG. 3C, where the key-value store 100 is shown comprising the pages 320.1-M which are associated with the clusters 310.1-M respectively. Also, the number and type of nodes in the clusters are only shown for exemplification purpose and for simplification of the description.

For each node $u_i$ of the graph 300, the method steps 305 to 311 may be performed. In step 305, the one or more pages which are assigned to the cluster of the node $u_i$ may be identified. For example, for the node $u_3$, the page 320.1 may be identified because the node $u_3$ is assigned to the cluster 310.1.

In step 307, the k-hop neighborhood $K_{u_i}$ of the node $u_i$ may be determined. In one example, k=1, k=2 or k=3. In step 309, a key may be stored in the page identified in step 305, wherein the key comprises an array of IDs $\{ID_{u_i}, \{ID_{u_j}, u_j \in K_{u_i}\}\}$, where $\{ID_{u_j}, u_j \in K_{u_i}\}$ is the set of IDs of the nodes of the k-hop neighborhood $K_{u_i}$ of the node $u_i$. In step 311, a value $value_{u_i}$ (e.g., comprising attribute values of the node $u_i$) may be stored in said page in association with the key of the node $u_i$. This is indicated in FIG. 3C, where the page 320.1 comprises records for the nodes of the cluster 310.1, the page 320.2 comprises records for the nodes of the cluster 310.2, the page 320.3 comprises records for the nodes of the cluster 310.3 and the page 320.M comprises records for the nodes of the cluster 310.M.

Figure 4:
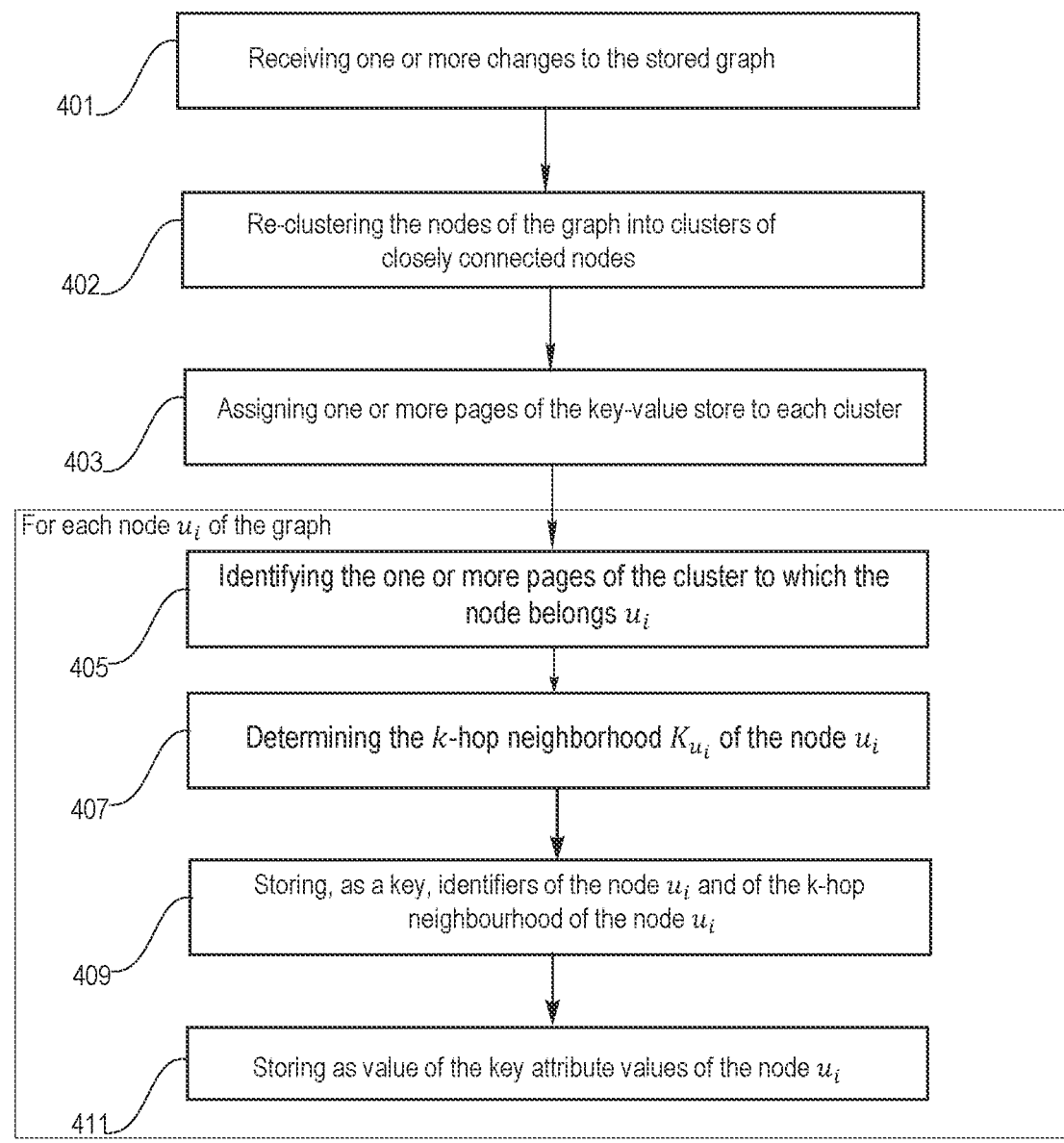
FIG. 4 is a flowchart of a method for managing a key-value store comprising nodes of a graph in accordance with an example of the present subject matter.

FIG. 4 is a flowchart of a method for managing a key-value store comprising nodes of a graph in accordance with an example of the present subject matter. The method of FIG. 4 may be described with reference to FIG. 1 and FIG. 3B, but it is not limited to that implementation.

In step 401, one or more changes of the graph 300 may be received. The nodes of the graph 300 may be re-clustered in step 402 into clusters of closely connected nodes. This may result in a number J of clusters which may be different from the clusters 310.1-M shown in FIG. 3B. Each of the J clusters may be assigned in step 403 one or more pages of the key-value store 100. For each node $u_i$ of the graph 300, the method steps 405 to 411 may be performed. In step 405, the one or more pages which are assigned to the cluster of node $u_i$ may be identified. In step 407, the k-hop neighborhood $K_{u_i}$ of the node $u_i$ may be determined. In one example, k=1, k=2 or k=3. In step 409, a key may be stored in the page identified in step 405, wherein the key comprises an array of IDs $\{ID_{u_i}, \{ID_{u_j}, u_j \varepsilon K_{u_i}\}\}$, where $\{ID_{u_j}, u_j \in K_{u_i}\}$ is the set of IDs of the nodes of the k-hop neighborhood $K_{u_i}$ of the node $u_i$. In step 411, a value $value_{u_i}$ (e.g., comprising attribute values of the node $u_i$) may be stored in said page in association with the key of the node $u_i$.

Figure 5A:
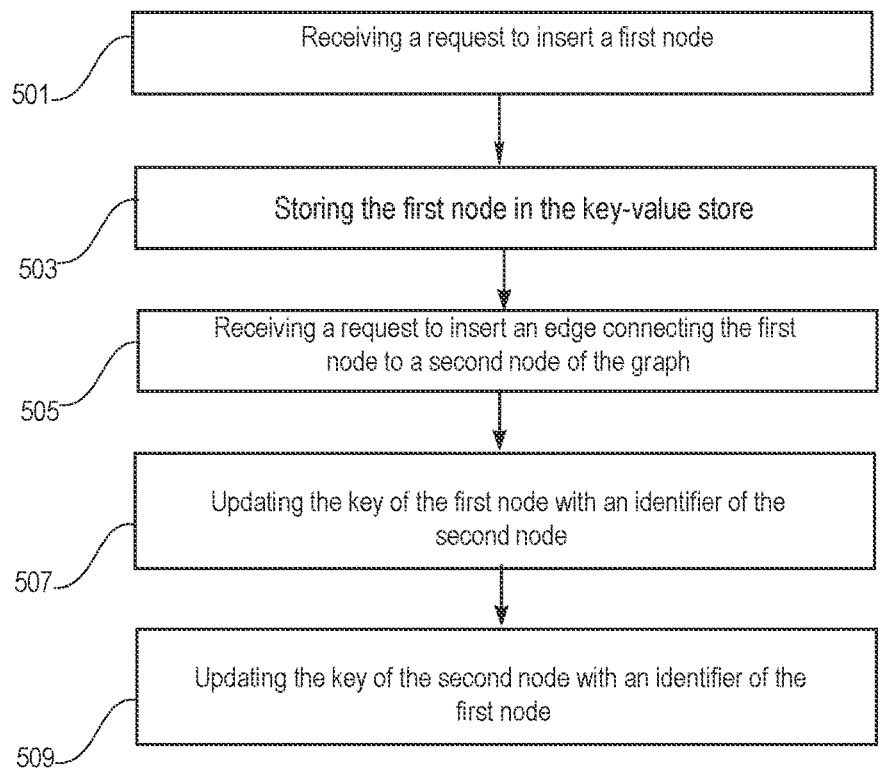
FIG. 5A is a flowchart of a method for managing a key-value store comprising nodes of a graph in accordance with an example of the present subject matter.

FIG. 5A is a flowchart of a method for managing a key-value store comprising nodes of a graph in accordance with an example of the present subject matter. The method of FIG. 5A may be described with reference to FIG. 1, but it is not limited to that implementation of FIG. 1.

Figure 5B:
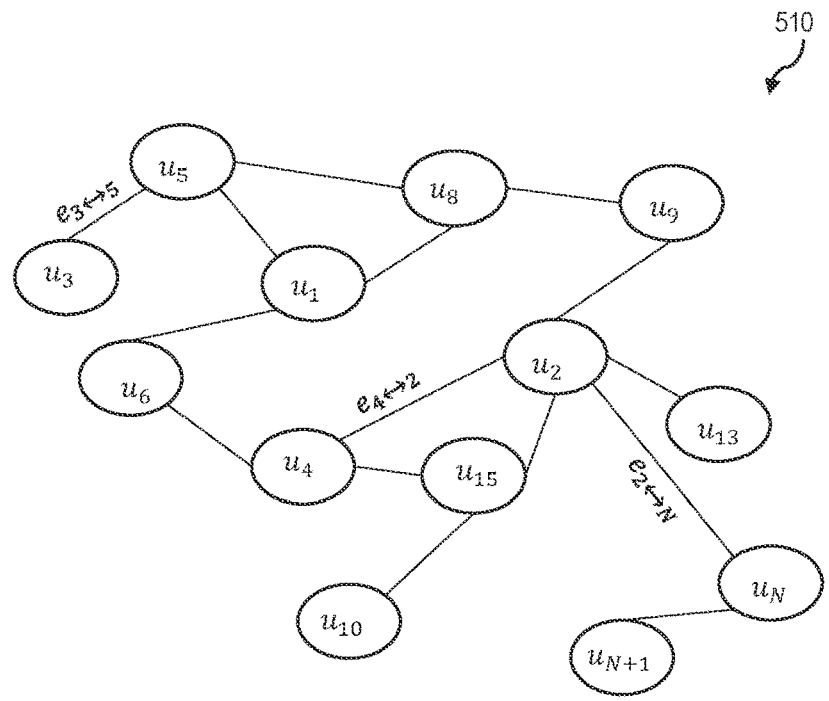
FIG. 5B is an example of a graph of nodes.
Figure 5C:
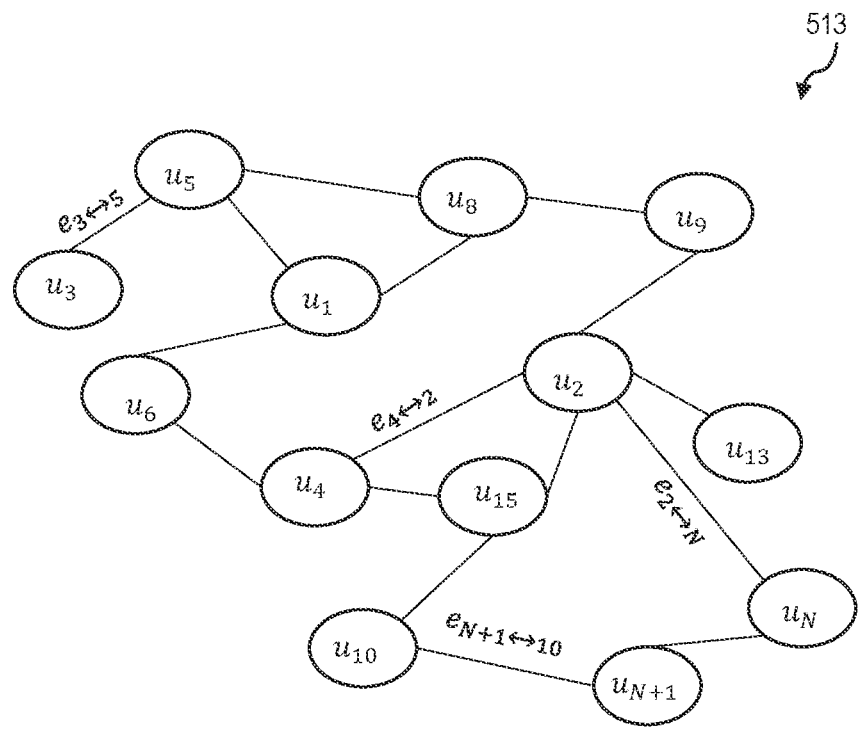
FIG. 5C is an example of a graph of nodes.

A request to insert a first node in the graph 101 may be received in step 501. In response to receiving the request to insert the first node, the first node may be stored in step 503 in the key-value store 100 using the storage method. The resulting graph 510 is shown in FIG. 5B, where node $u_{N+1}$ is added and the entry of the key-value store associated with the node $u_{N+1}$ may be as follows: $(\{ID_{u_{N+1}}, \{ID_{u_j}, u_j \in K_{u_{N+1}}\}\}, value_{u_{N+1}})$ A request to insert an edge connecting the first node to a second node of the graph may be received in step 505. This is indicated, for example, in graph 513 in FIG. 5C with the addition of the edge $e_{N+1 \leftrightarrow 10}$ D which connects the inserted node $u_{N+1}$ with the exiting node $u_{10}$. The key $\{ID_{u_{N+1}}, \{ID_{u_j}, u_j \in K_{u_{N+1}}\}\}$ of the first node $u_{N+1}$ may be updated in step 507 with the identifier $ID_{u_{10}}$ of the second node $u_{10}$. For that, the identifier $ID_{u_{10}}$ may be added to $K_{u_{N+1}}$, the k-hop neighborhood of the first node $u_{N+1}$. The key $\{ID_{u_{10}}, \{ID_{u_j}, u_j \in K_{u_{10}}\}\}$ of the second node $u_{10}$ may be updated in step 509 with the identifier $ID_{u_{N+1}}$ of the first node $u_{N+1}$. For that, the identifier $ID_{u_{N+1}}$ may be added to $K_{u_{10}}$, the k-hop neighborhood of the second node $u_{10}$.

Figure 6A:
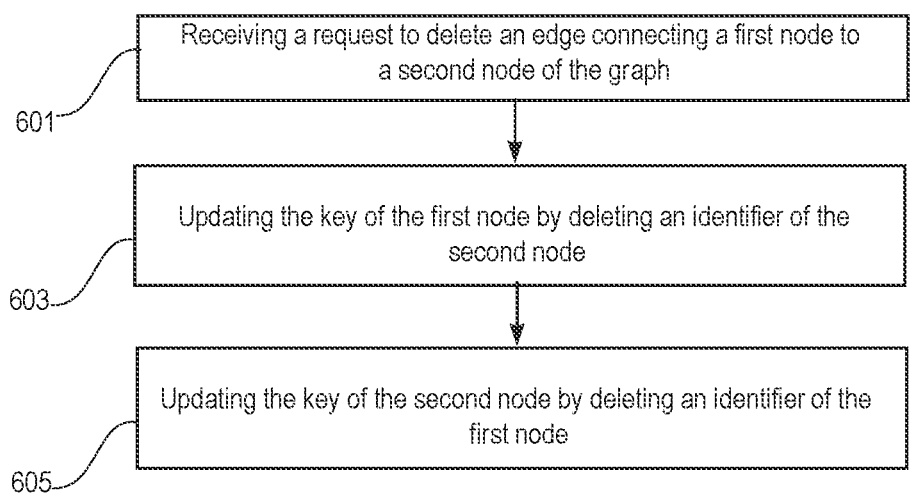
FIG. 6A is a flowchart of a method for managing a key-value store comprising nodes of a graph in accordance with an example of the present subject matter.

FIG. 6A is a flowchart of a method for managing a key-value store comprising nodes of a graph in accordance with an example of the present subject matter. The method of FIG. 6A may be described with reference to FIG. 1, but it is not limited to that implementation of FIG. 1.

Figure 6B:
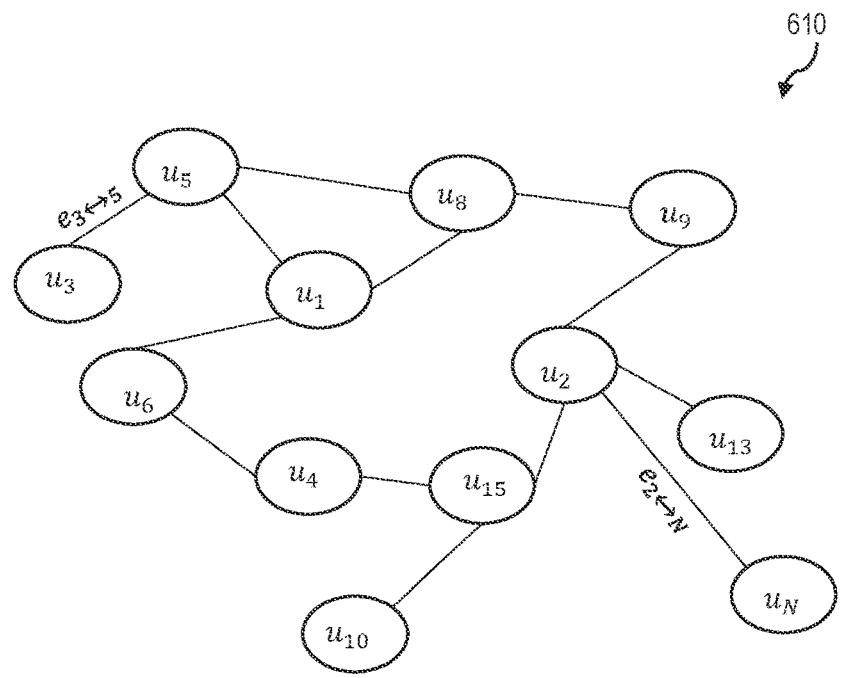
FIG. 6B is an example of a graph of nodes.

A request to delete an edge connecting a first node to a second node of the graph 101 may be received in step 601. This is indicated, for example, in the graph 610 in FIG. 6B where the edge to be deleted is the edge $e_{4 \leftrightarrow 2}$ which connects the first node $u_4$ with the second node $u_2$. The key $\{ID_{u_4}, \{ID_{u_j}, u_j \in K_{u_4}\}\}$ of the first node $u_4$ may be updated in step 603 by deleting the identifier $ID_{u_2}$ of the second node from $K_{u_4}$, the k-hop neighborhood of the first node $u_4$. The key $\{ID_{u_2}, \{ID_{u_j}, u_j \in K_{u_2}\}\}$ of the second node $u_2$ may be updated in step 605 by deleting the identifier $ID_{u_4}$ of the first node from $K_{u_2}$, the k-hop neighborhood of the second node $u_2$.

Figure 7A:
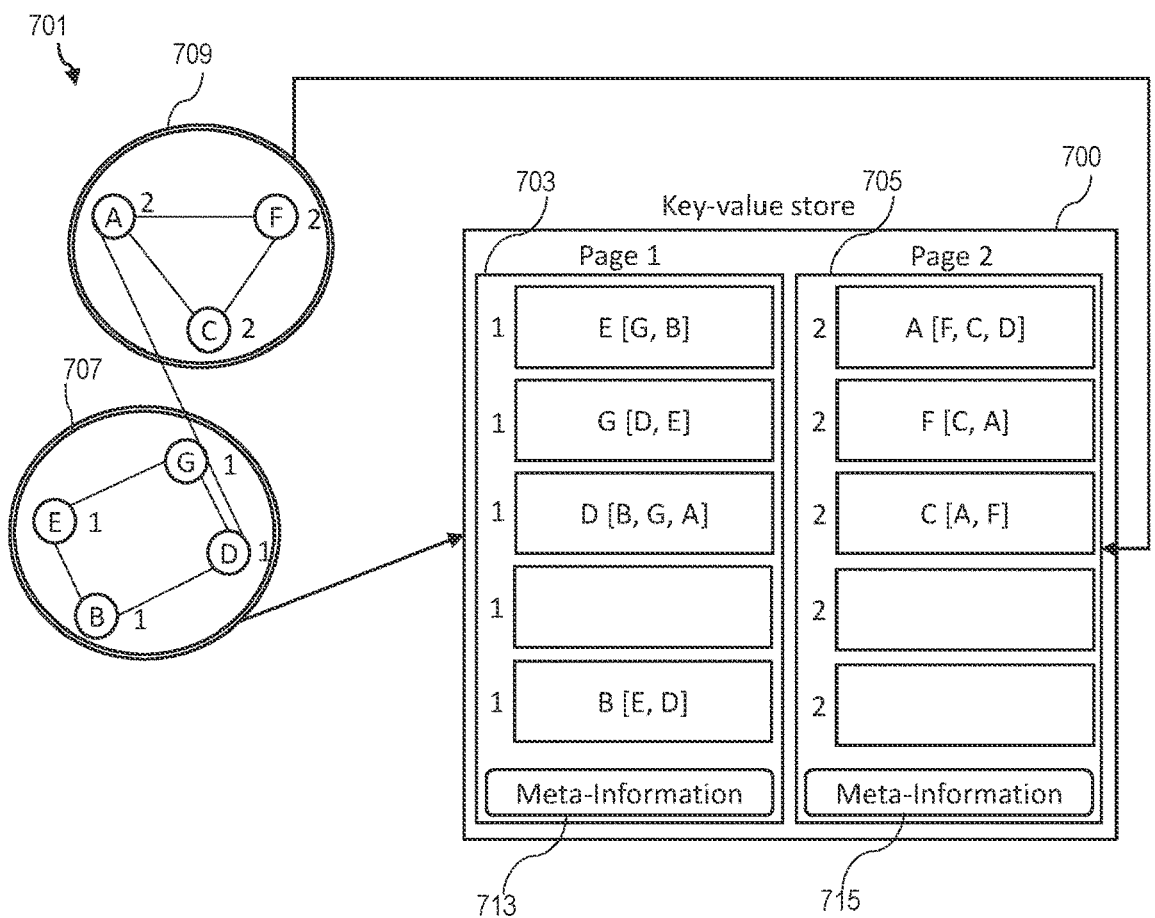
FIG. 7A is a diagram illustrating the content status of a key-value store.
Figure 7B:
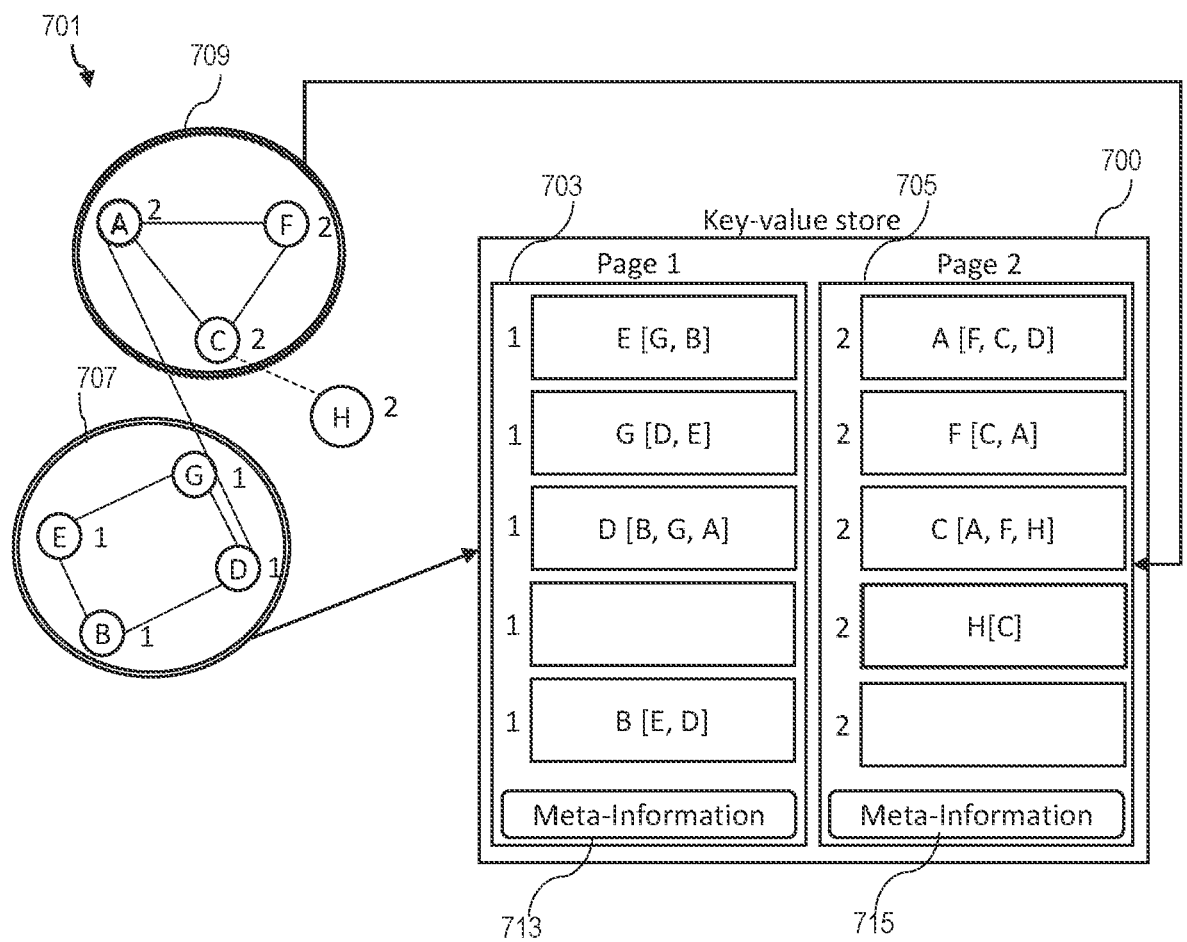
FIG. 7B is a diagram illustrating the content status of a key-value store.

FIGS. 7A-B show block diagrams illustrating a method for managing a key-value store comprising nodes of a graph in accordance with an example of the present subject matter. The graph 701 is shown in FIGS. 7A, wherein the nodes are stored in the key-value store 700. For exemplification purpose, the key-value store 700 may be provided with two pages 703 and 705 that can each hold four nodes. The page 703 comprises meta information 713. The page 705 comprises meta information 715. The meta information 713 may comprise at least one of the following: pointer to the next page 705, number of nodes on the page 703 or information indicating whether a node of the page 703 is stored across more than one page. The meta information 715 may comprise at least one of the following: pointer to the previous page 703, number of nodes on the page 705 or information indicating whether a node of the page 705 is stored across more than one page.

The clustering algorithm that clusters the graph 701 may identify two clusters 707 and 709 and assigns the nodes in the cluster logical IDs, where the logical ID for cluster 707 is one and the logical ID of the cluster 709 is two. Cluster 707 comprises four nodes having technical IDs B, D, E and G. Cluster 709 comprises three nodes having technical IDs A, C and F. The cluster 707 may be assigned to the page 703 and the cluster 709 may be assigned to the page 705. The nodes of the clusters 707 and 709 may be stored on respective pages 703 and 705 together with the technical IDs of adjacent nodes in an array list. This is indicated in FIG. 7A, where the page 703 comprises 4 keys in the form of array lists. The key of the node having technical ID E is provided as an array list: E[G,B]. It comprises the technical IDs of the node E and its 1-hop neighborhood nodes G and B. The key of the node having technical ID G is provided as an array list: G[D,E]. It comprises the technical IDs of the node G and its 1-hop neighborhood nodes D and E. The key of the node having technical ID D is provided as an array list: D[B,G,A]. It comprises the technical IDs of the node D and its 1-hop neighborhood nodes B, G and A. The key of the node having technical ID B is provided as an array list: B[E,D]. It comprises the technical IDs of the node B and its 1-hop neighborhood nodes E and D.

Similarly, the page 705 comprises 3 keys in the form of array lists. The key of the node having technical ID A is provided as an array list: A[F,C,D]. It comprises the technical IDs of the node A and its 1-hop neighborhood nodes F, C and D. The key of the node having technical IDs F is provided as an array list: F[C,A]. It comprises the technical IDs of the node F and its 1-hop neighborhood nodes C and A. The key of the node having technical ID C is provided as an array list: C[A,F]. It comprises the technical IDs of the node C and its 1-hop neighborhood nodes A and F.

As indicated in FIG. 7B, if a new node having technical ID H is added, it is initially added to the cluster that most of its neighbors are a part of (without having to re-cluster). The new node H may thus be added, for example, to the cluster 709. The clustering algorithm may only be rerun when a threshold of new transactions is surpassed. After adding the new node H, the key-value store 700 may be updated accordingly. First, the node H may be stored in the page 705 because the cluster 709 to which node H belongs is assigned to that page 705. This is indicated in FIG. 7B where the key of the node H is provided as an array list: H[C]. It comprises the technical IDs of the node H and its 1-hop neighborhood node C. Second, the key of the node C to which the new node H is linked may be updated by adding the node H to the 1-hop neighborhood of the node C. This is indicated in FIG. 7B, where the key of the node having technical ID C is provided as an array list: C[A,F,H]. It comprises the technical IDs of the node C and its 1-hop neighborhood nodes A, F and H. The key-value store 700 may, for example, be queried using the IDs. For example, to query for the neighbors of node "F", the query may be executed by a command using the technical ID "F" of the node as argument: getKeyForPrefix("F"), which would return the Key "F[C, A]" from which the neighboring nodes may be derived.

Computing environment 800 contains an example of an environment for the execution of at least some of the computer code involved in performing the inventive methods, such as code 900 for improved storage of graph data in a key-value store. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Figure 8:
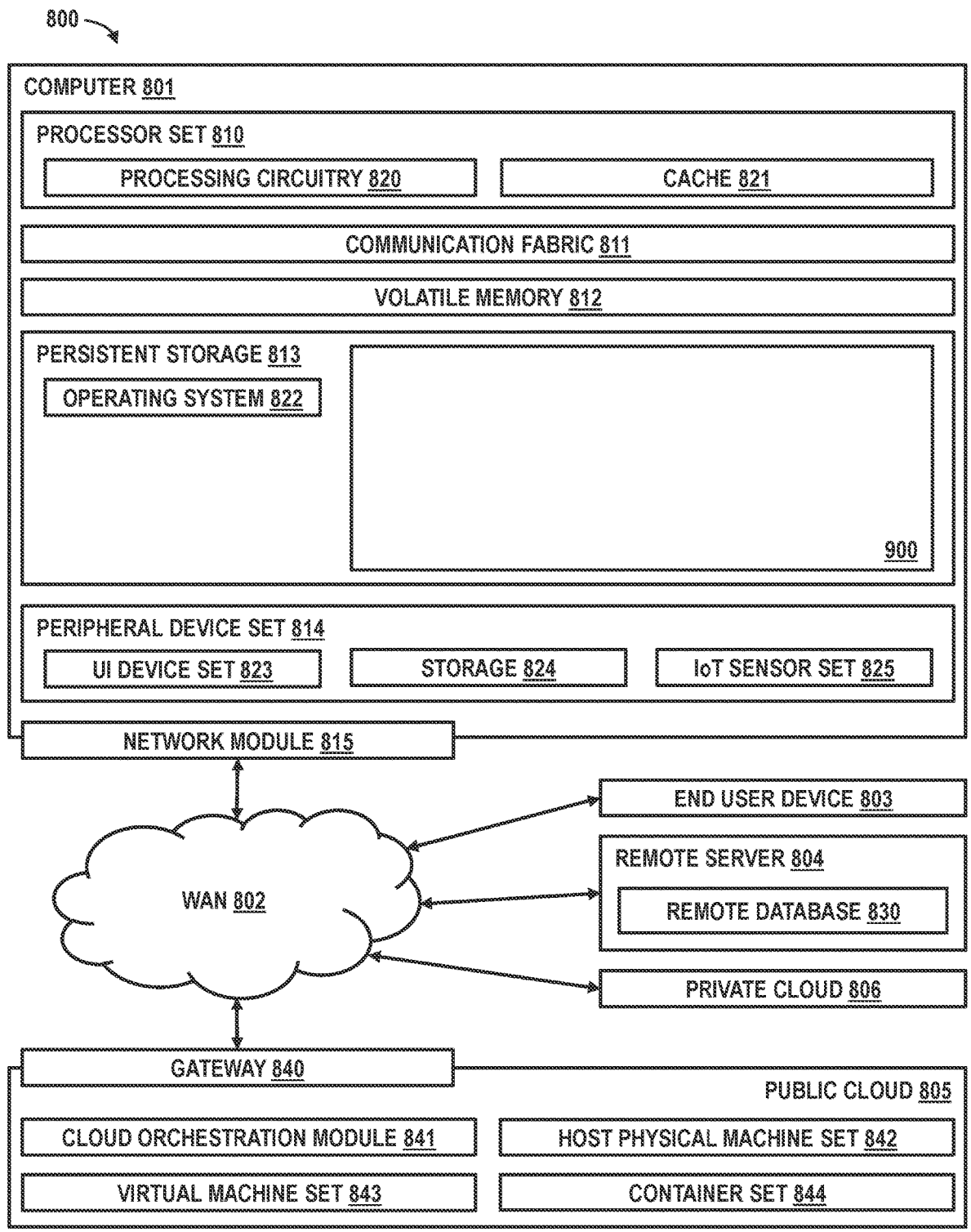
FIG. 8 is a computing environment in accordance with an example of the present subject matter.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

Processor Set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

Communication Fabric 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

Persistent Storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in block 900 typically includes at least some of the computer code involved in performing the inventive methods.

Peripheral Device Set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network Module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote Server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public Cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The invention claimed is:

1. A method for storing a graph, the method comprising:
providing a key-value store;
storing a graph in the key-value store, wherein storing a specific node of the graph in the key-value store comprises:
storing, as a key, identifiers of the specific node and of k-hop neighborhood of the specific node, and as value of the key, attribute values of the specific node, wherein the k-hop neighborhood of the specific node comprises a set of neighboring nodes that are reachable from the specific node within k edges;
clustering a plurality of nodes of the graph into one or more clusters of closely connected nodes;
assigning one or more pages of the key-value store to each of the one or more clusters, wherein storing the specific node in the key-value store comprises:
identifying the one or more pages of a cluster to which the specific node belongs; and
storing the specific node in the one or more pages identified, such that storing the nodes on the pages leaves in each of the one or more pages a predefined minimum free space;
receiving a gremlin query, wherein the gremlin query includes a requested node and connected nodes of a k-hop neighborhood for the requested node; and
retrieving, via a single node lookup, a key of the requested node based on a technical ID search of key parts of the key-value store for the requested node, wherein the key of the requested node includes the connected nodes of the k-hop neighborhood of the requested node.

2. The method of claim 1, wherein the k-hop neighborhood is a one hop neighborhood comprising adjacent neighbors of the specific node.

3. The method of claim 1, wherein the one or more pages assigned to each of the one or more clusters are adjacent pages.

4. The method of claim 1, wherein the clustering is performed such that the plurality of nodes of each of the one or more clusters are stored in a single page.

5. The method of claim 1, wherein an identifier for each of the plurality of nodes includes a logical ID and a technical ID, and wherein the logical ID indicates a cluster of a corresponding node, and the technical ID indicates the graph of the corresponding node.

6. The method of claim 1, wherein the number of assigned pages to store nodes of the cluster is one, the method further comprising: in a case where the cluster cannot be stored in one page, splitting the cluster into two or more clusters, such that each of the two or more clusters can be stored in one page.

7. The method of claim 1, further comprising:
receiving a request to insert a node;

determining a closest cluster to the node, wherein the closest cluster comprises a largest part of the neighboring nodes of the node; and storing the node in the one or more pages assigned to the determined cluster.

8. The method of claim 1, further comprising:

receiving one or more changes to the stored graph, wherein the one or more changes is greater than a minimum number of changes;

re-clustering the nodes of a changed graph;

reassigning the one or more pages to at least one of the plurality of clusters; and storing the nodes of the at least one cluster in the one or more pages reassigned.

9. The method of claim 1, further comprising:

receiving a request to insert a first node;

storing the first node in the key-value store;

receiving a request to insert an edge connecting the first node and a second node of the graph;

updating the key of the first node with a second node identifier; and updating the key of the second node with a first node identifier.

10. The method of claim 1, further comprising:

receiving a request to delete an edge connecting a first node to a second node of the graph;

updating a first node key by deleting an identifier of the second node; and updating a second node key by deleting an identifier of the first node.

11. The method of claim 1, further comprising:

receiving a request to delete at least one of the plurality of nodes of the key-value store; and deleting the at least one node and all edges connected to the at least one node, wherein deleting includes updating the key for each of the plurality of nodes to which said edges are connected such that the identifier of the at least one deleted node is removed from the keys.

12. A computer system for storing a graph, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

providing a key-value store;

storing a graph in the key-value store, wherein storing a specific node of the graph in the key-value store comprises:

storing, as a key, identifiers of the specific node and of k-hop neighborhood of the specific node, and as value of the key, attribute values of the specific node, wherein the k-hop neighborhood of the specific node comprises a set of neighboring nodes that are reachable from the specific node within k edges;

clustering a plurality of nodes of the graph into one or more clusters of closely connected nodes;

assigning one or more pages of the key-value store to each of the one or more clusters, wherein storing the specific node in the key-value store comprises:

identifying the one or more pages of a cluster to which the specific node belongs; and storing the specific node in the one or more pages identified, such that storing the nodes on the pages leaves in each of the one or more pages a predefined minimum free space;

receiving a gremlin query, wherein the gremlin query includes a requested node and connected nodes of a k-hop neighborhood for the requested node; and retrieving, via a single node lookup, a key of the requested node based on a technical ID search of key parts of the key-value store for the requested node, wherein the key of the requested node includes the connected nodes of the k-hop neighborhood of the requested node.

13. The computer system of claim 12, wherein the k-hop neighborhood is a one hop neighborhood comprising adjacent neighbors of the specific node.

14. The computer system of claim 12, wherein the one or more pages assigned to each of the one or more clusters are adjacent pages.

15. The computer system of claim 12, further comprising:

receiving a request to insert a node;

determining a closest cluster to the node, wherein the closest cluster comprises a largest part of the neighboring nodes of the node; and storing the node in the one or more pages assigned to the determined cluster.

16. A computer program product for storing a graph, comprising:

one or more non-transitory computer readable storage media, and program instructions collectively stored on the one or more non-transitory computer readable storage media, the program instructions comprising:

providing a key-value store;

storing a graph in the key-value store, wherein storing a specific node of the graph in the key-value store comprises:

storing, as a key, identifiers of the specific node and of k-hop neighborhood of the specific node, and as value of the key, attribute values of the specific node, wherein the k-hop neighborhood of the specific node comprises a set of neighboring nodes that are reachable from the specific node within k edges;

clustering a plurality of nodes of the graph into one or more clusters of closely connected nodes;

assigning one or more pages of the key-value store to each of the one or more clusters, wherein storing the specific node in the key-value store comprises:

identifying the one or more pages of a cluster to which the specific node belongs; and storing the specific node in the one or more pages identified, such that storing the nodes on the pages leaves in each of the one or more pages a predefined minimum free space;

receiving a gremlin query, wherein the gremlin query includes a requested node and connected nodes of a k-hop neighborhood for the requested node; and retrieving, via a single node lookup, a key of the requested node based on a technical ID search of key parts of the key-value store for the requested node, wherein the key of the requested node includes the connected nodes of the k-hop neighborhood of the requested node.

17. The computer program product of claim 16, wherein the k-hop neighborhood is a one hop neighborhood comprising adjacent neighbors of the specific node.

18. The computer program product of claim 16, wherein the one or more pages assigned to each of the one or more clusters are adjacent pages.

19. The computer program product of claim 16, further comprising:
- receiving a request to insert a node;
- determining a closest cluster to the node, wherein the closest cluster comprises a largest part of the neighboring nodes of the node; and
- storing the node in the one or more pages assigned to the determined cluster.

* * * * *